A. J. BISHOP.
COMBINED HAND TRUCK AND SCALE.
APPLICATION FILED JAN. 17, 1918.
1,342,246.
Patented June 1, 1920.
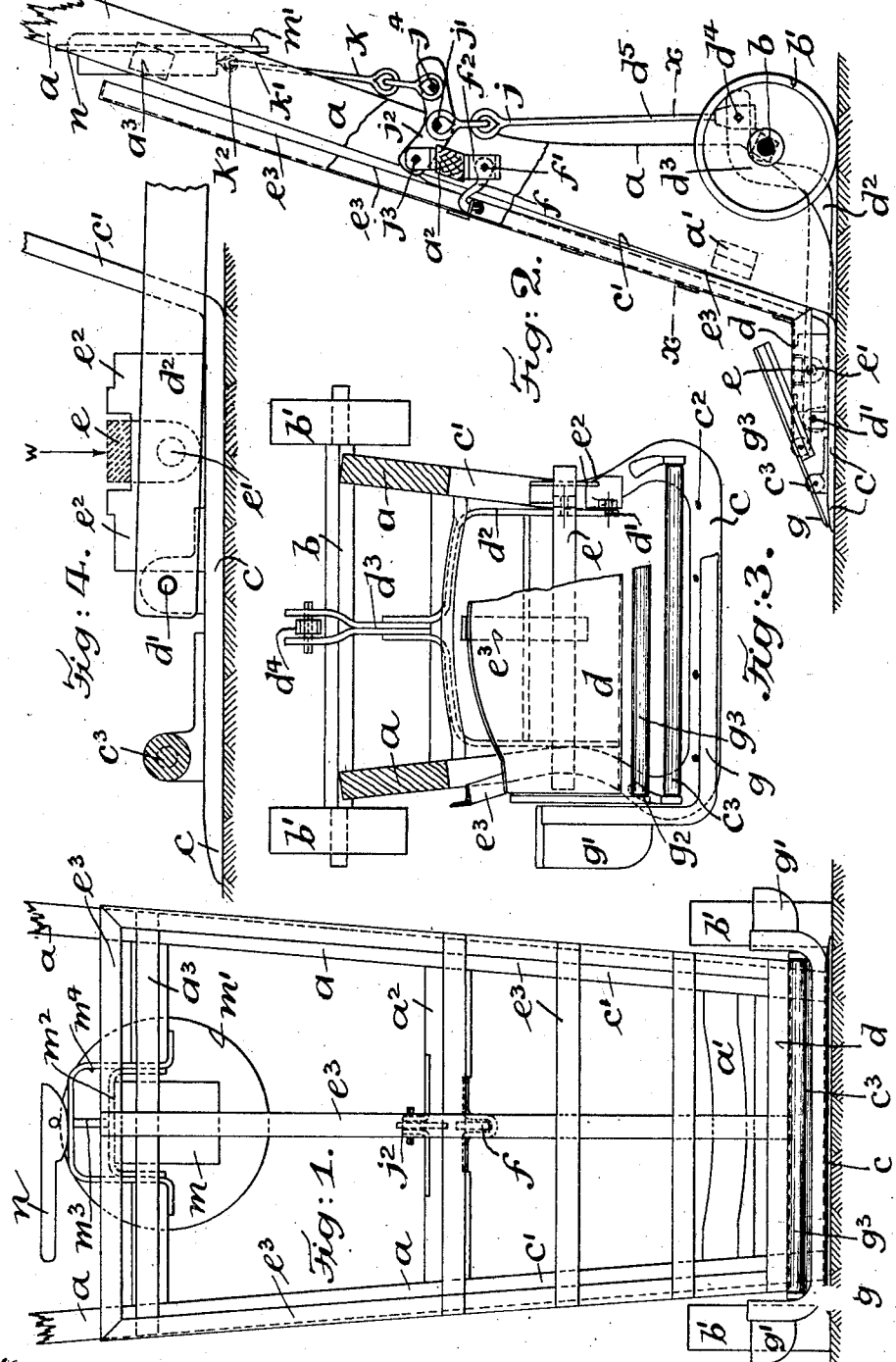

UNITED STATES PATENT OFFICE.

ALFRED JAMES BISHOP, OF BURSWOOD, AUSTRALIA.

COMBINED HAND-TRUCK AND SCALE.

1,342,246.

Specification of Letters Patent.

Patented June 1, 1920.

Application filed January 17, 1918. Serial No. 212,249.

*To all whom it may concern:*

Be it known that I, ALFRED JAMES BISHOP, a subject of the King of Great Britain, residing at Hawksburn Road, Burswood, Western Australia, Commonwealth of Australia, have invented certain new and useful Improvements in Combined Hand-Trucks and Scales, of which the following is a specification.

The aim of this invention is to provide an appliance which by its peculiar construction and combination of parts incorporates with a usual type of hand truck the uses and functions of a scales or weighing machine whereby goods or merchandise or such like may be trucked—weighed and conveyed by the one and same undisturbed handling and operation.

The invention essentially resides in the use and application of a weighing appliance in operative combination with a hand truck or analogous wheel borne vehicle and whereby the truck and scales combined are operatively incorporated and made to form and constitute one appliance having dual functions in the selfsame integrally constructional unit. The construction and use of the invention will now be explained with the aid of the attached drawings wherein Figure —1— is a front elevation and Fig. —2— a side elevation showing the appliance in position for the weighing operation and in this latter figure the auxiliary hinged purchase lip is in its "tilted" position for facilitating the "taking up" or reception of the "load."

Fig. —3— is a plan view partly broken away on line $x$—$x$ of Fig. —2—. Fig. —4— is a side view of the weigh lever and beam and in this view the letter W and directional arrow denotes the line of "load" imposed on the weigh beam.

Referring to said drawings—I employ a hand truck of the well known type and design and which truck acts as the foundation body frame for the scales—said truck having the side members $a$—the cross stays $a^1$—$a^2$—$a^3$ and the front axle $b$ and wheels $b^1$. On the head or front of said truck body is bolted the frontwardly extending purchase bracket or weight receiving portion $c$ which by its side members $c^1$ is bolted to the members $a$ of the truck said bracket having the front lip which acts as the "purchase agent" and the projectional pins or ledges $c^2$ on same act as stops for the auxiliary hinged platform extension when "taking up" the "load" and as hereafter referred to.

On the bracket $c$ is carried the transverse roller $c^3$ which gives an easy lead on to the platform $d$ for the load as W intended to be weighed or trucked, said platform constituting the weight receiving portion of the weighing mechanism. On said bracket $c$ as shown in Fig. —4— is pivoted at $d^1$ the forked lever or beam $d^2$ having the upwardly and centrally extending and rectangular terminal $d^3$—same being provided with knife edge bearings $d^4$ to which is hingeably attached the upright pull bar $d^5$. Near to the pivot $d^1$ of the lever beam $d^2$ is positioned the transverse weigh beam $e$ carried on knife edge bearings $e^1$ and on said beam is imposed the weighing platform $d$ being secured thereto by bolts or rivets. This platform and beam when in the idle or inoperative position are removed off of the knife edge bearings $e^1$ and rest at each end on an upstanding slotted seat plate or ledge $e^2$ secured on the lipped bracket $c$. The weighing platform $d$ is made with an open spaced or barred back as $e^3$ against which the load rests when being trucked or weighed. This back $e^3$ extends sufficiently high for the purposes required and is held in correct position by a knife edged retention pawl $f$ pivoted by knife edge $f^1$ to the bracket $f^2$ on the central cross member $a^2$ of the truck.

The object of said pawl is to lock the platform $d$ in its true and direct weighing position on the weigh beam $e$ and thus prevent faulty weighing and resultant inaccurate indication of the weight of the load. The platform $d$ at its front hingeably carries an auxiliary or extensional lifting lip $g$ having ledges $g^1$ which act as side extensions for the platform and this lip is adapted to tilt as seen in Fig. —2— and facilitate the "taking up" of the load. On the hinge bar $g^2$ of this auxiliary lip $g$ is carried the roller $g^3$ which acts companion-wise with the roller $c^3$ on the lipped bracket $c$ aforesaid. The pull rod $d^5$ at its upper and hooked end $j$ (see Fig. —2—) is detachably connected by shackle and knife edge bearing $j^1$ to a strain and movement reducing lever $j^2$ pivoted at $j^3$ to the central cross member $a^2$ of the truck.

The object of this lever $j^2$ and members is to act as agents for reducing "strain" on the weight indicating members and also to reduce the unit of distance of the movement of the weighing members. This lever $j^2$ at its outer end by knife edge bearing and shackle $j^4$ is connected to the upper pull rod $k$ which at its upper and hooked end $k^1$ connects up with the pull bar $k^2$ of the weight indicating device. This device being of the usual spring balance type and mounted in casing $m$ to same is attached the weight indicator dial $m^1$ said dial and casing is held on the inner frame $m^2$ having guide stem $m^3$ whereby said frame $m^2$ is adapted to slidably work in an outer frame $m^4$ held on the top cross member $a^3$ and on the under or rear side of said truck body frame. The weight indicator and weighing members are adapted to be thrown in and out of engagement by the hand operated pawl $n$ pivotally carried on the head of the guide stem $m^3$ of said slidable frame $m^2$ as seen in Figs. 1 and 2.

This cam when brought into contact against the top face of frame $m^4$ puts into operation said weight indicator and weighing members while by a reverse movement of said cam said members are thrown out of engagement or to their idle position. The method and use of the invention is mainly as follows:—The appliance by its wheels $b^1$ is moved up to the load as W intended to be trucked and weighed and to the position seen in Fig. —2— the auxiliary hinged lip $g$ being tilted so as to easily receive or "take up" the load on to the weighing platform $d$ being assisted by the rollers $c^3$ and $g^3$ whereupon said lip resumes its horizontal or normal position. The cam $n$ is now depressed thus imposing the weight strain on the beam $e$ and the thereto connected weight indicator and weighing members and whereby the true weight of the load is weighed and ascertained in usual manner.

By a reverse movement of the cam $n$ said members are rendered inoperative or idle— the weigh beam $e$ is relieved of all strain and the platform $d$ rests on the upstanding plates or ledges $c^2$. The load may now be removed from the platform or wheeled away "truckwise" to the desired destination.

I do not limit myself to the precise or exact details of construction herein set forth as it is obvious to those who are conversant with the art to which this invention appertains that modifications and variations of construction may be made without vitally departing from the constructional principles and scope involved and embodied in the invention.

What I claim as my invention and desire to secure by Letters Patent is—

1. A combined truck and scales comprising a wheeled truck body having a weight receiving portion, weighing mechanism on said truck body having a weighing platform, and a tilting lip for transferring a load from said weight receiving portion to said platform.

2. A combined truck and scales comprising a wheeled truck body, relatively vertically disposed weighing mechanism on said truck body including a platform and a load-supporting frame and adapted to be supported in inoperative position thereon, and means for lifting said weighing mechanism from said truck body into weighing position.

3. A device of the character described comprising a wheeled truck body having a weight receiving portion, relatively vertically disposed weighing mechanism on said truck body including a weighing platform adapted to receive a load taken up by said weight receiving portion and to be supported in inoperative position thereon, and a supporting frame to maintain the load in position on said weighing platform, said device having provision for lifting said weighing platform from said weight receiving portion into weighing position.

4. A combined truck and scales comprising a wheeled truck body, a weighing platform adapted to be supported by said truck body and a supporting frame adapted to maintain the load in position on said weighing platform, vertically disposed weight counterbalancing and indicating means, and means whereby said platform may be lifted from said body and operatively connected with said weight indicating means.

5. A combined truck and scales comprising a wheeled truck body, a weighing platform adapted to be supported by said truck body, weight counter-balancing and indicating means, means for operatively connecting said platform and weight indicating means, and means for raising said weight indicating means and thereby lifting said platform from said truck body.

6. A device of the character described comprising a wheeled truck body having a weight receiving portion, a lever pivoted thereto, a weighing platform carried by said lever and adapted to be supported by said weight receiving portion, weight counterbalancing and indicating means, and means for operatively connecting said lever and weight indicating means, said device having provision for lifting said platform from said weight receiving portion and causing the same to be sustained solely by said lever.

7. A combined truck and scales comprising a wheeled truck body having a weight receiving portion, a lever pivoted thereto, a weighing platform carried by said lever and adapted to be supported by said weight receiving portion, weight counter-balancing and indicating means, means for operatively connecting said lever and weight indicating means, and means for raising said weight indicating means and thereby lifting said platform from said weight receiving portion.

8. A combined truck and scales comprising a frame including a cross-bar and having a weight reception roller, a weigh beam, a platform carried by said weigh beam and having a hinged extension adapted to receive a load passing over said roller and a back member, and a pawl pivotally connected to the cross-bar of said frame and coöperating with said back member for locking said platform on the weigh beam, substantially as herein set forth and shown.

In testimony whereof I have hereunto set my hand in presence of two subscribing witnesses.

ALFRED JAMES BISHOP.

Witnesses:
RICHARD SPARROW,
U. W. BURKE.